May 9, 1950 L. MILTENBERG ET AL 2,507,215
ELECTRICAL EDUCATIONAL QUESTION AND ANSWER GAME
Filed Dec. 13, 1945 2 Sheets-Sheet 1

INVENTORS,
LEONARD MILTENBERG
and JUDD L. BECKOFF,
BY
Irving Seidman
ATTORNEY

May 9, 1950     L. MILTENBERG ET AL     2,507,215
ELECTRICAL EDUCATIONAL QUESTION AND ANSWER GAME
Filed Dec. 13, 1945     2 Sheets-Sheet 2

INVENTORS,
LEONARD MILTENBERG
BY   and JUDDL BECKOFF,
*Irving Seidman*
ATTORNEY

Patented May 9, 1950

2,507,215

UNITED STATES PATENT OFFICE 2,507,215

ELECTRICAL EDUCATIONAL QUESTION AND ANSWER GAME

Leonard Miltenberg, New York, and Judd L. Beckoff, Brooklyn, N. Y., assignors to Normilart Corporation, New York, N. Y.

Application December 13, 1945, Serial No. 634,748

3 Claims. (Cl. 35—9)

This invention relates to an amusement device of a "question and answer" type that will combine with its use both pleasure and instruction and, more particularly, does this invention relate to a device wherein the answers to the question are indicated in an affirmative or negative form.

An object of this invention is to provide a device of the character described comprising a series of question discs, each disc interchangeable upon a turntable on the device, a coacting selector disc rotating in unison with the question disc and a circuit-closing means manually operated by the player or operator to close an electric circuit to flash a signal light when the correct answer to the question under consideration has been indicated.

Another object of this invention is the inclusion therein of a means for providing an electric current which will energize a signal light when the correct answer to a question is indicated.

A further object of this invention is the inclusion therein of a simple selector disc co-acting with the question disc to permit the manually controlled means to close an electric circuit and flash a signal light when the correct answer to a question is indicated.

A still further object of this invention is the provision therein of a simple means employed to lock together the question disc and the selector disc so that they move in unison.

A further object of this invention is the inclusion in same of a series of question discs having both sides imprinted with questions and having markers thereon which will coincide with a fixed marker upon the device to permit the correct alignment of the question to be considered.

A further object of this invention is the inclusion in same of the particular formation of the question and selector disc-locking means to form a fingerhold to turn the said discs.

A further object of this invention is the provision in same of a storage space for a number of question discs.

For a fuller understanding of the nature and objects of my invention, reference is had to the following detailed description in connection with the accompanying drawings in which.

Figure 1:
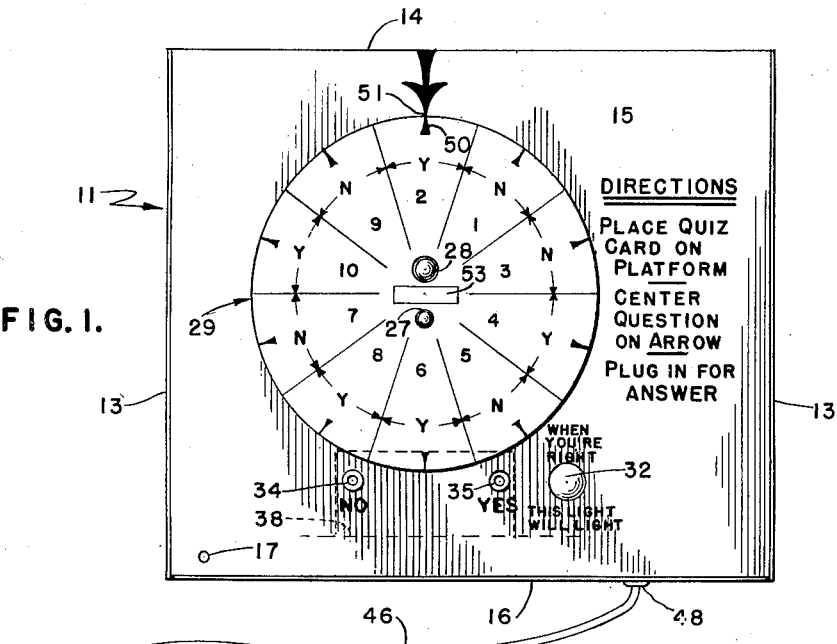
Figure 1 is a top or plan view showing the operating platform of the device and shows a question disc in place thereon.

Referring in detail to the parts, numeral 11 designates a cabinet having a bottom 12, side walls 13, a rear wall 14, and a top 15, hereinafter designated as the platform. The front end of the cabinet is open but is provided with a closure member 16, pivotly secured to the cabinet by nails 17 or other suitable fastening. This panel is adapted to swing outwardly as indicated by the dot-dash line, shown in Figure 2.

Rotatably mounted inside the cabinet and under the platform is a disk 18, hereinafter designated as a selector disk and having peripheral cut out portions 19, 20, 21 and 22 formed between peripheral projecting portions 19', 20', 21' and 22'. The said selector disk is attached to a spacer at washer 23 which engages through a perforation in the said platform and is in turn attached to a plate 24 rotatably movable upon the upper and outer side of said platform. The selector disk 18, spacer 23 and plate 24 are held together by means of rivets 25 and 26 and are adapted to rotate in unison or as a single unit.

The said rivets 25 and 26 are elongated upwardly as at 27 and 28 respectively to form a finger hold with which the said plate 24 and its connected selector disk 18 may be turned. The said upwardly extending formations 27 and 28 of the rivets 25 and 26 provide keys which vary in diameter. The diameter of the key formed at 27 being smaller than the diameter of the key formed at 28 thus providing a means for properly positioning a question disk 29 upon the platform and plate. The said question disk 29 being provided with a small perforation 30 which is adapted to engage the said key formation 27 and a larger perforation 31 which is adapted to engage the larger key formation 28. The said question disc 29, when in use, engages over the said keys and rests upon the plate 24 as indicated by the dot-dash line in Figure 3. The full line indicating the question disc shows the said disc withdrawn from the keys.

Figure 3:
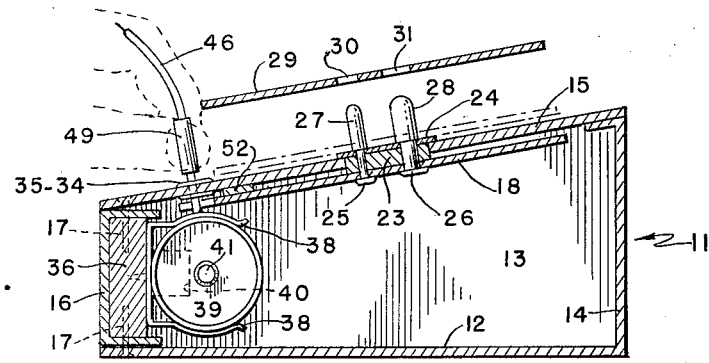
Figure 3 is a cross section taken along the line 3—3 of Figure 2 and looking in the direction indicated by the arrows.
Figure 4:
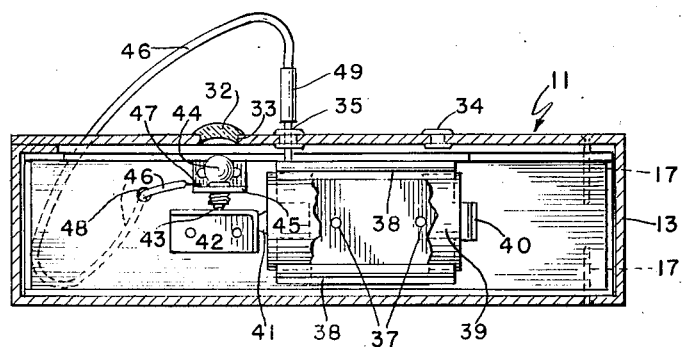
Figure 4 is a sectional view taken along the line 4—4 of Figure 2 and shows a portion broken away and looking in the direction indicated by the arrows.

A lens or crystal 32 is set in an opening 33 in the platform to project a flash from a signal light within the cabinet and perforations 34 and 35 are provided in the platform as indicated in Figures 1, 3 and 4, for the purpose hereinafter described.

The swinging door or panel 16 is of channel formation in cross section (see Figure 3) and has secured therein a block or chassis 36 of wood or any other suitable material which will not conduct electrical current. Attached to the said chassis by means of nails or screws 37, is a spring metal, electric current-conducting pocket 38 in which a dry battery 39 is nested. At one end of the said pocket 38 and formed integrally with it is a spring arm 40 which contacts the negative end of the battery. The central post or positive side of the battery 41 engages against a bracket 42 extending from and secured to the aforesaid chassis. The spring arm 40 while making an electrical contact with the negative side of the battery also exerts a pressure against the battery to maintain a close electrical contact between the positive pole 41 and the bracket 42 which, in turn, contacts the terminal 43 of a light bulb 44. The said light bulb is held in position upon an electrical-conducting bracket 45 attached to and extending from the chassis and which makes electrical connection with said light bulb in the usual manner.

Figure 2:
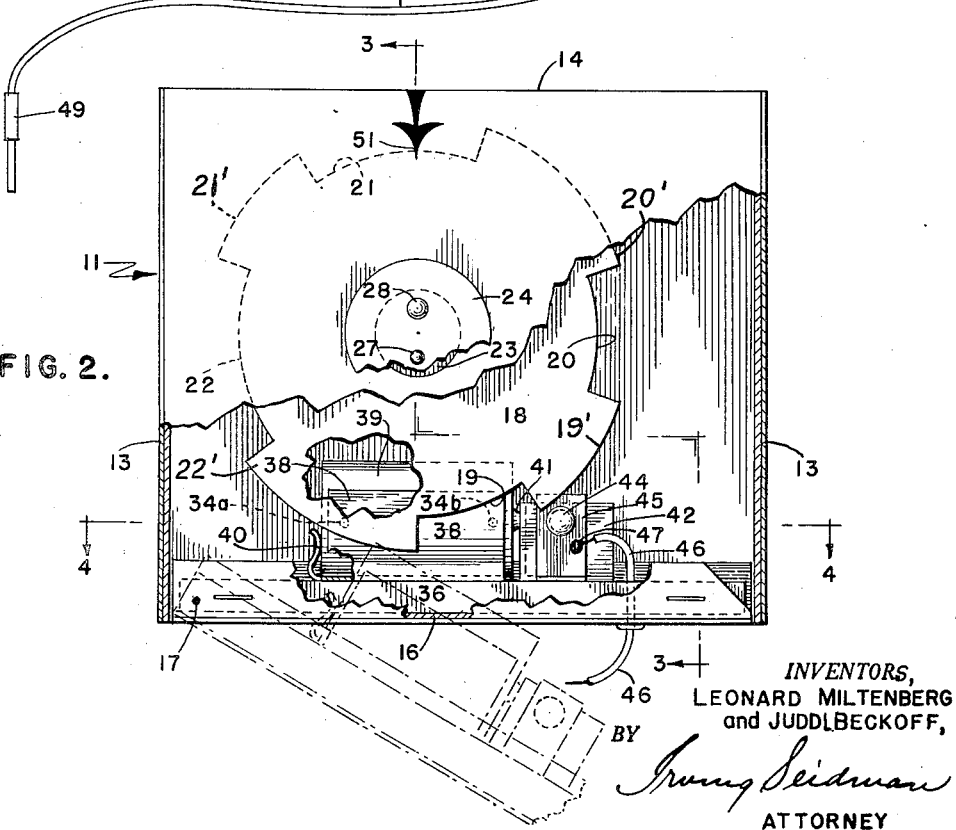
Figure 2 is a top or plan view of the device with the question disc removed and parts broken away to better illustrate the interior mechanism.

A flexible electrical conductor 46 is soldered or otherwise secured at one end 47 to the lamp-carrying bracket 45 (see Figures 2 and 4). The said electrical conductor 46 passes through an aperture 48 which is in the chassis and has secured at its outer end a terminal plug 49 which, when operating the device, is adapted to engage through either perforation 34 or 35 for a purpose that will be hereinafter described.

Figures 5, 6:
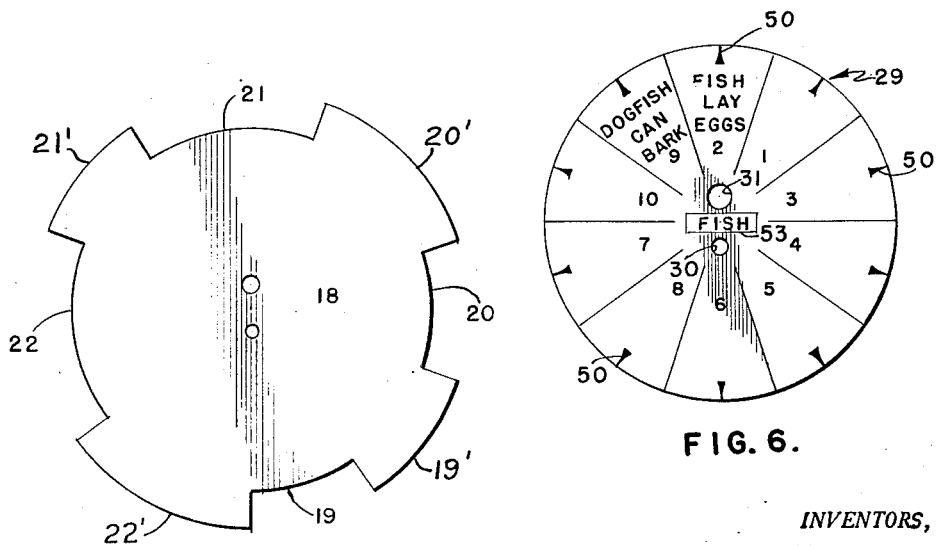
Figure 5 is a plan view of the selector disc.
Figure 6 is a plan view of the question disc.

The question disc shown in operative position in Figure 1 and in detail in Figure 6 is divided into segmental panels designated by the reference numerals 1, 2, 3, 4, 5, 6, 7, 8, 9, and 10, and in each panel there is imprinted a question which is answerable in an affirmative or negative form. The said affirmatively and negatively answered questions are arranged in the panels (see Figure 1) as indicated by the reference letters Y or N respectively. Two sample questions are indicated in Figure 6, the one indicated in panel 2 reading "Fish lay eggs," requires an affirmative answer while the question indicated in panel 9 reading "Dogfish can bark" requires a negative answer, and so on around the disc in each panel a question may be imprinted; the segments represented by the even reference numerals 2, 4, 6, 8 and 10 indicating panels upon which questions requiring an affirmative answer are imprinted, while the segments represented by the odd reference numerals 1, 3, 5, 7, and 9 indicate panels upon which questions requiring a negative answer are imprinted. It will be noted that panel indicated by the reference numeral 2 is adjacent to and radially alined with the large perforation 31 in the question disc thus assuring the proper positioning of the question disc relatively with the selector disc 18 with which it rotates.

The reverse side of the disc may be similarly paneled for questions which must be arranged in the same relative position when the disc is facing upwardly upon the platform of the device. Markers or aligning spots 50 are centrally located in each panel along the periphery of the question disc, and each marker must line up with the indicating mark 51 upon the platform to assure the proper setting of the said question disc 29 and its connected selector disc 18.

The perforations 34 and 35 may be marked with the words "No" and "Yes" respectively, or in lieu of the word "Yes" the words "Right" or "True" may be used and in lieu of the word "No" the words "Wrong" or "False" may be used.

A spacer strip 52 may be fastened under the platform 15 as shown in Figure 3 and forms a track for the selector disc 18 to ride against.

The questions on each face of the question discs may be grouped in classifications and the classification marked in a panel 53 provided therefor. In Figure 6 the questions shown on the question disc are classified under the heading of "Fish."

*Operation*

With the question disc 29 set in position as shown in Figure 1, the operator or player determines the answer to the question shown in panel No. 2 and inserts the plug in the "No" or "Yes" perforation 34 or 35. If the player inserts the plug in the "Yes" perforation 35 the pin of the plug will pass through the cutout portion 19 of the selector disc 18 and make an electrical contact at the contact point 34b, thus closing the circuit to light the bulb 44, the rays of which will flash through the lens 32 and signal the operator that the answer is correct.

If, however, the player inserts the plug 49 into and through the perforation 34 no electric contact is established due to the masking of the contact point 34a by the projecting portion of the perimeter of the selector disc and no signal appears, thereby indicating to the player that the answer is incorrect.

The question in panel 9 calls for a negative answer and when the panel carrying this question is centered on the mark 51 on the platform, the contact point 34b is masked by the projection on the perimeter of the selector disc, thus preventing the closure of the electric circuit at that point. The contact point 34a, however, is uncovered and permits an electric contact to be made by the plug 49 and indicate to the player that "No" is the correct answer.

The free space in the cabinet may be employed to store question discs.

We claim:

1. A question and answer game comprising a cabinet in combination with an interchangeable question disk rotatably mounted upon said cabinet, a non conducting selector disk having peripheral cut out portions and adapted to rotate with the said question disk, a source of electric current mounted within said cabinet, a signal light one terminal of which has electrical connection with one pole of the said source of electrical current, a flexible conductor electrically connected to the second terminal of said light signal, an electrical conductor cage in said cabinet holding said source of electric current and making electrical contact with the opposite pole of said source, a plug upon said flexible electric conductor and adapted to engage through perforations in said cabinet to contact the said cage to close an electric circuit when a cut out portion of said selector disk is aligned with the said opening in the said cabinet.

2. The apparatus as set forth in claim 1, wherein a pair of positioning keys of different shapes and engaging through corresponding perforations in said question disk are provided to properly position the said question disk with respect to the coacting selector disk.

3. The apparatus as set forth in claim 1, including a lens mounted upon the said cabinet coaxially with said light bulb to display a light when the said plug contacts the said battery cage and closes the battery circuit to the light bulb.

LEONARD MILTENBERG.
JUDD L. BECKOFF.

REFERENCES CITED

The following references are of record in the file of this patent:

UNITED STATES PATENTS

| Number | Name | Date |
|---|---|---|
| 1,479,992 | Kinney | Jan. 8, 1924 |
| 1,860,895 | Marx | May 31, 1932 |
| 1,948,712 | Hornung | Feb. 27, 1934 |
| 2,030,175 | Le Fevre | Feb. 11, 1936 |
| 2,092,577 | Hornung | Sept. 7, 1937 |
| 2,104,718 | Dougherty | Jan. 4, 1938 |

FOREIGN PATENTS

| Number | Country | Date |
|---|---|---|
| 45,507 | Austria | 1911 |
| 381,787 | Germany | 1923 |